US009462078B2

(12) United States Patent
Matsubara et al.

(10) Patent No.: US 9,462,078 B2
(45) Date of Patent: Oct. 4, 2016

(54) INFORMATION TRANSMISSION DEVICE, NETWORK SYSTEM, AND INFORMATION TRANSMISSION METHOD

(75) Inventors: Masazumi Matsubara, Kawasaki (JP); Atsuji Sekiguchi, Kawasaki (JP); Yuji Wada, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 331 days.

(21) Appl. No.: 13/064,548

(22) Filed: Mar. 30, 2011

(65) Prior Publication Data
US 2012/0030671 A1 Feb. 2, 2012

(30) Foreign Application Priority Data

Jul. 28, 2010 (JP) ................. 2010-169847

(51) Int. Cl.
G06F 9/455 (2006.01)
G06F 15/16 (2006.01)
G06F 12/14 (2006.01)
H04L 29/08 (2006.01)
G06F 9/445 (2006.01)

(52) U.S. Cl.
CPC ................. H04L 67/34 (2013.01); G06F 8/65 (2013.01); G06F 9/45533 (2013.01)

(58) Field of Classification Search
CPC ........ G06F 9/5077; G06F 21/10; G06F 3/06; G06F 3/0601; H04L 63/0428
USPC .............. 713/150, 165, 189, 162; 726/2, 21; 718/1; 711/100, 114, 203; 705/51, 56, 705/59; 709/218, 219
See application file for complete search history.

(56) References Cited

U.S. PATENT DOCUMENTS

| 6,748,448 | B1 * | 6/2004 | Barrera et al. ................ 709/245 |
| 7,206,832 | B2 | 4/2007 | Matsunami et al. |
| 2001/0049740 | A1 * | 12/2001 | Karpoff .............. H04L 12/5601 |
| | | | 709/231 |
| 2002/0062429 | A1 * | 5/2002 | Tsuboki et al. ............... 711/154 |
| 2003/0014600 | A1 * | 1/2003 | Ito et al. ....................... 711/152 |
| 2004/0054866 | A1 * | 3/2004 | Blumenau et al. ........... 711/202 |
| 2004/0153740 | A1 * | 8/2004 | Fujimoto .......................... 714/7 |
| 2004/0225691 | A1 * | 11/2004 | Hirao ............................ 707/200 |

(Continued)

FOREIGN PATENT DOCUMENTS

| JP | 2000-259583 | 9/2000 |
| JP | 2004-310166 | 11/2004 |

(Continued)

OTHER PUBLICATIONS

Japanese Office Action mailed Feb. 12, 2014 in corresponding Japanese Patent Application No. 2010-169847.

Primary Examiner — Shanto M Abedin
(74) Attorney, Agent, or Firm — Staas & Halsey LLP

(57) ABSTRACT

An information transmission device stores an identifier representing an information processing device connected to a network in association with an identifier representing a storage device used by the information processing device. When transmission of information is requested from the information processing device, the information transmission device specifies an identifier representing an information processing device. The information transmission device acquires an identifier representing a storage device stored in association with the specified identifier. The information transmission device transmits information on a request for transmission by the information processing device to the storage device represented by the acquired identifier.

10 Claims, 13 Drawing Sheets

(56) References Cited

U.S. PATENT DOCUMENTS

| | | | |
|---|---|---|---|
| 2005/0003859 A1* | 1/2005 | Morisaki et al. | 455/557 |
| 2007/0300062 A1* | 12/2007 | Osmond et al. | 713/165 |
| 2008/0046544 A1* | 2/2008 | Sakoh et al. | 709/219 |
| 2008/0098392 A1* | 4/2008 | Wipfel et al. | 718/1 |
| 2008/0299909 A1* | 12/2008 | Sakai | 455/66.1 |
| 2009/0022324 A1* | 1/2009 | Inokuchi et al. | 380/279 |
| 2009/0063728 A1* | 3/2009 | Arimilli et al. | 710/31 |
| 2009/0157846 A1* | 6/2009 | Shimozono et al. | 709/218 |
| 2009/0300733 A1* | 12/2009 | Inomata et al. | 726/5 |
| 2010/0036850 A1* | 2/2010 | Garman et al. | 707/10 |
| 2010/0138604 A1* | 6/2010 | Noguchi et al. | 711/114 |
| 2010/0250873 A1* | 9/2010 | Fujii et al. | 711/154 |
| 2010/0333116 A1* | 12/2010 | Prahlad et al. | 719/328 |
| 2011/0004555 A1* | 1/2011 | Onda et al. | 705/59 |

FOREIGN PATENT DOCUMENTS

| | | |
|---|---|---|
| JP | 2005-332223 | 12/2005 |
| JP | 2009-187247 | 8/2009 |

* cited by examiner

FIG.4

| VM ID | VM IMAGE ID | STORAGE SYSTEM ID |
|---|---|---|
| vm01 | vm_imgA | STORAGE SYSTEM A |
| vm02 | vm_imgB | STORAGE SYSTEM B |
| vm03 | vm_imgC | STORAGE SYSTEM C |
| ... | ... | ... |

FIG.5

| VM ID | ENCRYPTION KEY |
|---|---|
| vm01 | xxx |
| vm02 | yyy |
| vm03 | zzz |
| ... | ... | ural machine are separately operated.
INFORMATION TRANSMISSION DEVICE, NETWORK SYSTEM, AND INFORMATION TRANSMISSION METHOD

CROSS-REFERENCE TO RELATED APPLICATION

This application is based upon and claims the benefit of priority of the prior Japanese Patent Application No. 2010-169847, filed on Jul. 28, 2010, the entire contents of which are incorporated herein by reference.

FIELD

The embodiments discussed herein are directed to an information transmission device, a network system, and an information transmission method.

BACKGROUND

Conventionally, there has been known a cloud technique in which a plurality of users share resources on a network using a virtualization technique of operating a plurality of virtual information processing devices. In a network system to which such a technique is applied, a virtual machine (VM) in which an information processing device is virtualized and a disk image that is a storage area used by the virtual machine are separately operated.

For example, in an example illustrated in FIG. 12, a physical machine 1 that operates a virtual machine VM1 and a physical machine 2 that operates virtual machines VM2 and VM3 are connected with a storage system 1 and a storage system 2 via a network. The storage system 1 manages a VM image 1 that is a disk image of the virtual machine VM1 and a VM image 2 that is a disk image of the virtual machine VM2. The storage system 2 manages a VM image 3 that is a disk image of the virtual machine VM3. FIG. 12 is a diagram for explaining an operation of a cloud network.

In this example, each of the virtual machines VM1 to VM3 accesses the VM image of the device itself managed by the storage system 1 or 2 via the network and uses the accessed VM image as a storage device of the device itself. For example, the virtual machine VM3 uses the VM image 3 managed by the storage system 2 as a storage device of the device itself using a technique such as Fibre Channel over Ethernet (FCoE) (a registered trademark).

Meanwhile, there has been known a technique of a server that transmits data such as update data or new software to an information processing device connected to a network. For example, in an example illustrated in FIG. 13, a plurality of information processing devices 1 to 3 is connected with a server that transmits update data to the information processing devices 1 to 3 via a network. FIG. 13 is a diagram for explaining transmission of update data in a conventional network.

In this example, when the transmission of update data is requested from the information processing device 1, the server transmits update data to the information processing device 1 via the network. Thereafter, when the update data is received, the information processing device 1 stores the received update data in a storage device of the device itself.

If the technique of the server that transmits data to the information processing devices is applied to the network to which the cloud technique is applied, the server transmits data to the virtual machine that has made a request for data transmission via the network. Thereafter, the virtual machine transmits data received from the server to the disk image of the device itself via the network and stores the data in the disk image of the device itself.

For example, FIG. 14 is a diagram for explaining a process of transmitting update data in a cloud network. In an example illustrated in FIG. 14, when the transmission of update data is requested from the virtual machine VM2, the server transmits the requested update data to the virtual machine VM2 via the network. Thereafter, the virtual machine VM2 transmits the received update data to the virtual image 2 managed by the storage system 1 via the network and stores the update data in the VM image 2.

However, in the above-described technique of transmitting data to each virtual machine, since data is transmitted to the virtual machine that has made a request for data transmission and the virtual machine transmits data to the disk image of the device itself, there has been a problem in that a load on a network increases.

That is, in the above-described technique of transmitting data to each virtual machine, data transmitted from the server is transmitted to the storage system that manages the disk image via the physical machine that operates the virtual machine. For this reason, data is transmitted twice, and thus a load on a network increases.

Patent Document: Japanese Laid-open Patent Publication No. 2005-332223.

SUMMARY

According to an aspect of an embodiment of the invention, an information transmission device includes a storage unit that stores an identifier representing an information processing device connected to a network in association with an identifier representing a storage device used by the information processing device; a processor to, when a notice requesting transmission of information is received from the information processing device, specify an identifier representing an information processing device that has transmitted the notice, to acquire an identifier representing a storage device stored in association with the specified identifier, and to control transmission of information on a request for transmission by the information processing device to the storage device represented by the acquired identifier acquired.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 4 is a diagram for explaining an example of information stored in a configuration management information storage unit;

FIG. 5 is a diagram for explaining an example of information stored in an encryption key storage unit;

DESCRIPTION OF EMBODIMENTS

Preferred embodiments of the present invention will be explained with reference to accompanying drawings.

[a] First Embodiment

Figure 1:
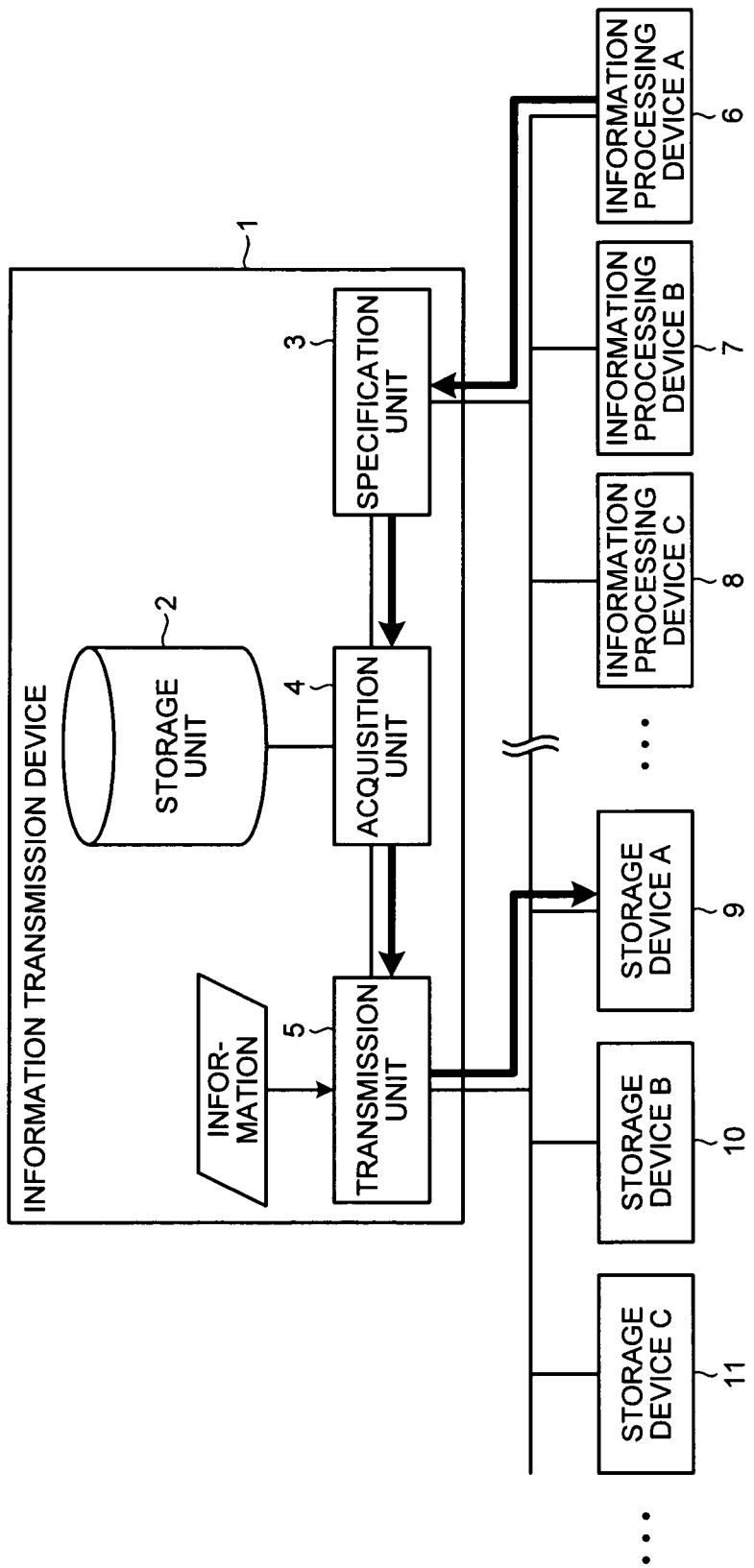
FIG. 1 is a diagram for explaining an information transmission device according to a first embodiment.

In a first embodiment, an example of an information transmission device will be described with reference to FIG. 1. FIG. 1 is a diagram for explaining an information transmission device according to a first embodiment.

As illustrated in FIG. 1, an information transmission device 1 includes a storage unit 2, a specification unit 3, an acquisition unit 4, and a transmission unit 5. The information transmission device 1 is connected with an information processing device A 6, an information processing device B 7, an information processing device C 8, a storage device A 9, a storage device B 10, and a storage device C 11 via a network. The storage device A 9 is a storage device used by the information processing device A 6. The storage device B 10 is a storage device used by the information processing device B 7. The storage device C 11 is a storage device used by the information processing device C 8.

The storage unit 2 stores identifiers representing the information processing devices A 6 to C 8 in association with identifiers representing the storage devices A 9 to C 11 respectively used by the information processing devices A 6 to C 8. That is, the storage unit 2 stores the identifier representing the information processing device A 6 in association with the identifier representing the storage device A 9. Further, the storage unit 2 stores the identifier representing the information processing device B 7 in association with the identifier representing the storage device B 10. Further, the storage unit 2 stores the identifier representing the information processing device C 8 in association with the identifier representing the storage device C 11.

The specification unit 3 specifies the identifier representing the information processing device A 6 when a notice requesting transmission of information is received from the information processing device A 6. The acquisition unit 4 acquires the identifier, which is stored in association with the identifier of the information processing device A 6 specified by the specification unit 3, from the storage unit 2. That is, the acquisition unit 4 acquires the identifier representing the storage device A 9 from the storage unit 2. The transmission unit 5 transmits information on a request for transmission by the information processing device A 6 to the storage device A 9 represented by the identifier acquired by the acquisition unit 4.

As described above, the information transmission device 1 stores the identifiers representing the information processing devices A 6 to C 8 in association with the identifiers representing the storage devices A 9 to C 11 used by the information processing device A 6 to C 8, respectively. Further, when an information transmission request is received from the information processing device A 6, the information processing device 1 transmits information directly to the storage device A 9 used by the information processing device A 6.

For this reason, the information transmission device 1 can reduce the load on the network. For example, when the information transmission device 1 is installed in a network to which a cloud technique is applied, the information transmission device 1 transmits requested information directly to the disk image used by the virtual machine. Thus, since the process of transmitting information to the disk image through the virtual machine is unnecessary, the information transmission device 1 can reduce the load on the network.

[b] Second Embodiment

In a second embodiment, a network system having an update proxy as an information transmission device will be described.

Figure 2:
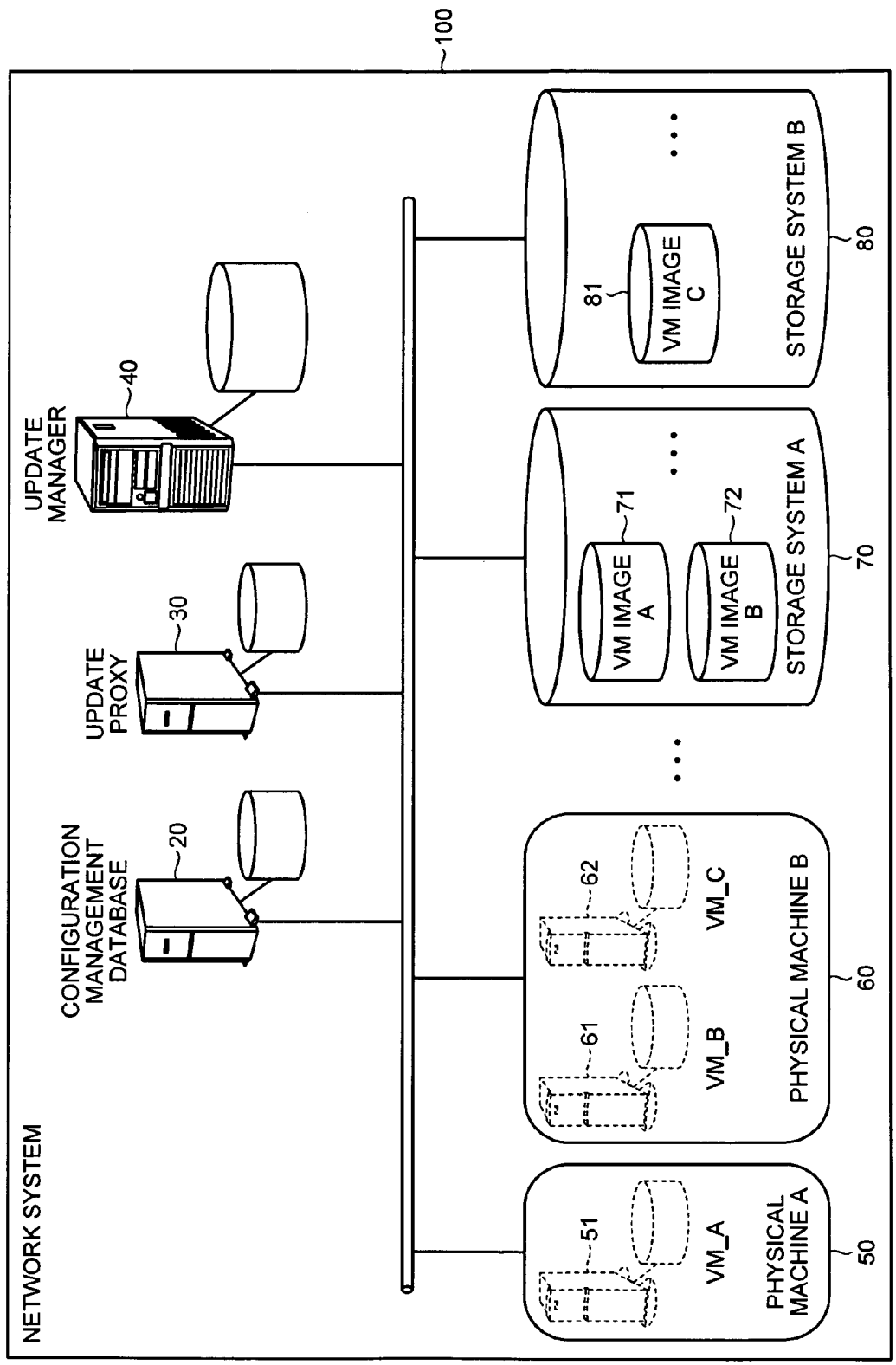
FIG. 2 is a diagram for explaining a network system having an update proxy according to a second embodiment.

First, a network system according to a second embodiment will be described with reference to FIG. 2. FIG. 2 is a diagram for explaining a network system having an update proxy according to the second embodiment.

In an example illustrated in FIG. 2, a network system 100 includes a configuration management database 20, an update proxy 30, an update manager 40, a physical machine A 50, a physical machine B 60, a storage system A 70, and a storage system B 80. The physical machine A 50 operates a virtual machine (VM)_A 51. The physical machine B 60 operates a VM_B 61 and a VM_C 62.

The storage system A 70 manages a VM image A 71 that is a disk image that the VM_A 51 uses as a storage device and a VM image 72 that is a disk image that the VM_B 61 uses as a storage device. The storage system B 80 manages a VM image C 81 that is a disk image that the VM_C 62 uses as a storage device.

Figure 3:
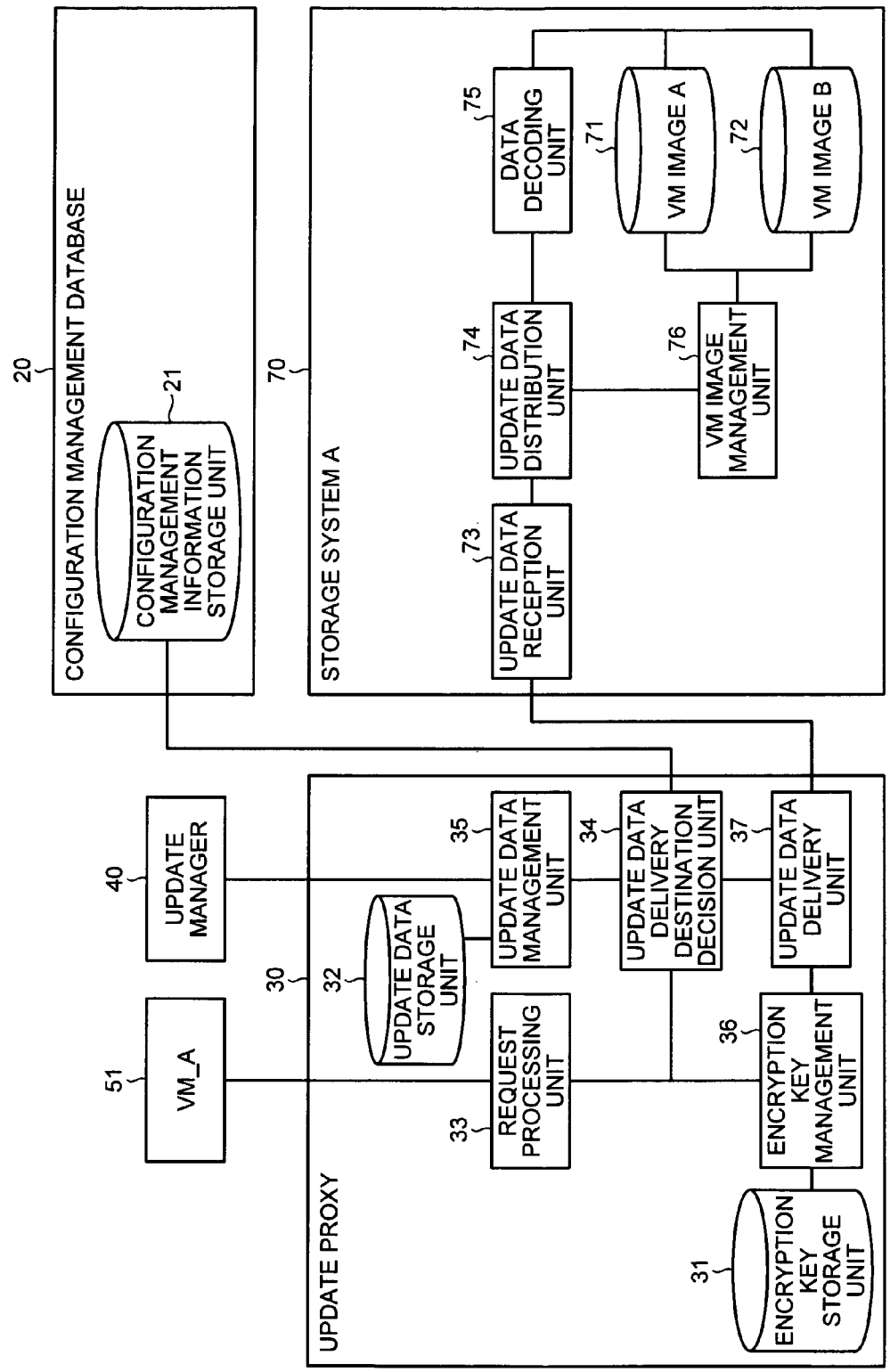
FIG. 3 is a diagram for explaining each of devices according to the second embodiment.

Next, configurations of the configuration management database 20, the update proxy 30, and the storage system A 70 will be described with reference to FIG. 3. FIG. 3 is a diagram for explaining each of the devices according to the second embodiment. Among the virtual machines, only the VM_A 51 is illustrated in FIG. 3, but the other virtual machines are connected in a similar manner. Further, the storage system A 70 is illustrated, but the storage system B 80 and the storage system A 70 also have the same configuration, and thus a description thereof will not be repeated.

In an example illustrated in FIG. 3, the configuration management database 20 includes a configuration management information storage unit 21. The update proxy 30 includes an encryption key storage unit 31, an update data storage unit 32, a request processing unit 33, and an update data delivery destination decision unit 34. The update proxy 30 further includes an update data management unit 35, an encryption key management unit 36, and an update data delivery unit 37. The storage system A 70 includes an update data reception unit 73, an update data distribution unit 74, a data decoding unit 75, and a VM image management unit 76.

First, the configuration management information storage unit 21 included in the configuration management database 20 will be described. The configuration management information storage unit 21 stores a VM_ID that is an identifier representing a virtual machine in association with a VM image ID that is an identifier representing a VM image. Specifically, the configuration management information storage unit 21 stores the VM_ID, the VM image ID, and a storage system ID that is an identifier representing a storage system for managing the VM image in association with one another.

For example, in an example illustrated in FIG. 4, the configuration management information storage unit 21 stores a VM_ID "vm01" representing the VM_A 51 in association with a VM image ID "vm_imgA" representing the VM image A 71. Further, the configuration management information storage unit 21 stores the VM_ID "vm01" in association with a storage system ID "storage system A." FIG. 4 is a diagram for explaining an example of information stored in the configuration management information storage unit.

Returning back to FIG. 3, a configuration of the update proxy 30 will be described. The encryption key storage unit 31 stores the VM_ID representing each virtual machine in association with an encryption key used by each virtual machine. For example, in an example illustrated in FIG. 5, the encryption key storage unit 31 stores the VM_ID "vm01" representing the virtual machine VM_A 51 in association with an encryption key "xxx" used by the VM_A 51. FIG. 5 is a diagram for explaining an example of information stored in the encryption key storage unit.

Here, the encryption key used by each virtual machine will be described. For example, the virtual machines may be used by different clients. In this case, for the sake of security, each VM image is encrypted so that an unauthorized client or a provider of a network system cannot access a content of the VM image without permission.

That is, the VM_A 51, the VM_B 61, and the VM_C 62 encrypt the VM image A 71, the VM image B 72, and the VM image C 81 that are the disk images of the virtual machines using different encryption keys, respectively. That is, the VM image A 71, the VM image B 72, and the VM image C 81 are encrypted using different encryption keys, respectively.

Returning back to FIG. 3, the update data storage unit 32 stores the update data to be transmitted to the virtual machine. For example, the update data storage unit 32 stores the update data to be transmitted to the VM_B 61.

The request processing unit 33 specifies the VM_ID representing the virtual machine that has requested transmission of information when a notice of requesting transmission of information is received from the virtual machine. Specifically, when a notice of requesting transmission of information is received from the virtual machine, the request processing unit 33 specifies the VM_ID representing the virtual machine and an update data ID representing information on a request for the transmission from the received notice. The request processing unit 33 transmits the specified VM_ID and the update data ID to the update data delivery destination decision unit 34. The request processing unit 33 transmits the specified VM_ID to the encryption key management unit 36.

For example, the request processing unit 33 receives an acquisition request for requesting transmission of update data from the VM_A 51. The request processing unit 33 specifies the VM_ID "vm01" representing the VM_A 51 and the update data ID representing the update data requested by the VM_A 51 from the acquisition request. Thereafter, the request processing unit 33 transmits the specified VM_ID "vm01" and the update data ID to the update data delivery destination decision unit 34. The request processing unit 33 transmits the specified VM_ID "vm01" to the encryption key management unit 36.

The update data delivery destination decision unit 34 acquires the VM image ID stored in association with the VM_ID specified by the request processing unit 33 from the configuration management information storage unit 21. Specifically, the update data delivery destination decision unit 34 acquires the VM_ID and the update data ID representing the update data requested by the virtual machine, which have been specified by the request processing unit 33. The update data delivery destination decision unit 34 acquires the VM image ID and the storage system ID that are stored in association with the VM_ID specified by the request processing unit 33 from the configuration management information storage unit 21 of the configuration management database 20.

The update data delivery destination decision unit 34 transmits the received update data ID to the update data management unit 35. Here, as will be described later, when the update data ID is received from the update data delivery destination decision unit 34, the update data management unit 35 transmits the update data represented by the received update data ID to the update data delivery destination decision unit 34. Thus, the update data delivery destination decision unit 34 acquires the update data requested by the virtual machine from the update data management unit 35.

Thereafter, the update data delivery destination decision unit 34 transmits the VM image ID and the storage system ID acquired from the configuration management information storage unit 21 and the update data acquired from the update data management unit 35 to the update data delivery unit 37.

Here, a concrete example of a process executed by the update data delivery destination decision unit 34 will be described. For example, the update data delivery destination decision unit 34 receives the VM_ID "vm01" and information representing the update data requested by the VM_A 51 from the request processing unit 33. When the VM_ID "vm01" and the update data ID representing the update data requested by the VM_A 51 are received from the request processing unit 33, the update data delivery destination decision unit 34 transmits the update data ID to the update data management unit 35. Thereafter, the update data delivery destination decision unit 34 receives the update data requested by the VM_A 51 from the update data management unit 35.

The update data delivery destination decision unit 34 retrieves the VM image ID and the storage system ID that are stored in association with the VM_ID "vm01" received from the request processing unit 33 from the configuration management information storage unit 21. The update data delivery destination decision unit 34 acquires the VM image ID "vm_imgA" and the storage system ID "storage system A" that are stored in association with the VM_ID "vm01" from the configuration management information storage unit 21. Thereafter, the update data delivery destination decision unit 34 transmits the acquired VM image "vm_imgA" and the storage system ID "storage system A" and the update data requested by the VM_A 51 to the update data delivery unit 37.

The update data management unit 35 determines whether or not the update data on a request for the transmission by the virtual machine is being stored in the update data storage unit 32. Specifically, the update data management unit 35 receives the update data ID from the update data delivery destination decision unit 34. The update data management unit 35 determines whether or not the update data represented by the received update data ID is being stored in the update data storage unit 32. When it is determined that the update data represented by the update data ID is not being stored in the update data storage unit 32, the update data management unit 35 acquires the update data represented by the update data ID from the update manager 40.

Thereafter, the update data management unit 35 stores the update data acquired from the update manager 40 in the update data storage unit 32 and transmits the acquired update data to the update data delivery destination decision unit 34. However, when it is determined that the update data represented by the update data ID is being stored in the update data storage unit 32, the update data management unit 35 acquires the update data from the update data storage unit 32 and transmits the acquired update data to the update data delivery destination decision unit 34.

The encryption key management unit 36 acquires the encryption key stored in association with the VM_ID specified by the request processing unit 33 from the encryption key storage unit 31. Specifically, the encryption key management unit 36 receives the VM_ID from the request processing unit 33. When the VM_ID is received from the request processing unit 33, the encryption key management unit 36 acquires the encryption key stored in association with the received VM_ID from the encryption key storage unit 31. The encryption key management unit 36 transmits the acquired encryption key to the update data delivery unit 37.

For example, the encryption key management unit 36 receives the VM_ID "vm01" from the request processing unit 33. When the VM_ID "vm01" is received from the request processing unit 33, the encryption key management unit 36 acquires the encryption key "xxx" stored in association with the VM_ID "vm01" from the encryption key storage unit 31. Thereafter, the encryption key management unit 36 transmits the acquired encryption key "xxx" to the update data delivery unit 37.

The update data delivery unit 37 transmits the update data on a request for the transmission by the virtual machine and the encryption key acquired by the encryption key management unit 36 to the VM image represented by the VM image ID acquired by the update data delivery destination decision unit 34.

Specifically, the update data delivery unit 37 receives the VM image ID and the storage system ID acquired by the update data delivery destination decision unit 34. The update data delivery unit 37 receives the encryption key acquired by the encryption key management unit 36. The update data delivery unit 37 receives the update data acquired by the update data management unit 35. The update data delivery unit 37 transmits the received encryption key and the update data to the VM image represented by the received VM image ID among the VM images managed by the storage system represented by the received storage system ID.

That is, the update data delivery unit 37 transmits the update not to the virtual machine that has requested transmission of the update data but to the VM image used by the virtual machine that has requested transmission of the update data. The update data delivery unit 37 transmits the update data and the encryption key used by the virtual machine that has requested transmission of the update data to the storage system.

Further, when it is determined that the update data storage unit 32 is not storing the update data that the virtual machine has requested the update data management unit 35 to transmit, the update data delivery unit 37 transmits the update data that the update data management unit 35 has acquired from the update manager 40. However, when it is determined that the update data storage unit 32 is storing the update data that the virtual machine has requested the update data management unit 35 to transmit, the update data delivery unit 37 transmits the update data stored in the update data storage unit 32.

For example, the update data delivery unit 37 receives the VM image ID "vm_imgA" and the storage system ID "storage system A" and the update data requested by the VM_A 51 from the update data delivery destination decision unit 34. The update data delivery unit 37 receives the encryption key "xxx" from the encryption key management unit 36. The update data delivery unit 37 transmits the received VM image ID "vm_imgA", the encryption key, and the update data to the storage system A 70 represented by the storage system ID "storage system A".

Next, a configuration of the storage system A 70 will be described. When the VM image ID, the encryption key, and the update data are received from the update data delivery unit 37 of the update proxy 30, the update data reception unit 73 transmits the VM image ID, the encryption key, and the update data to the update data distribution unit 74.

For example, the update data reception unit 73 receives the VM image ID "vm_imgA", the encryption key "xxx", and the update data from the update data delivery unit 37 of the update proxy 30. The update data reception unit 73 transmits the VM image ID "vm_imgA", the encryption key "xxx", and the update data to the update data distribution unit 74.

When the update data and the encryption key are received from the update proxy 30, the update data distribution unit 74 stores the received update data in the VM image using the received encryption key.

Specifically, the update data distributing unit 74 receives the VM image ID, the encryption key, and the update data transmitted from the update data delivery unit 37 of the update proxy 30 through the update data reception unit 73. The update data distribution unit 74 transmits the received VM image ID and the encryption key to the data decoding unit 75. The update data distribution unit 74 transmits the received VM image ID and the update data to the VM image management unit 76.

Here, as will be described later, when the VM image ID and the encryption key are received from the update data distribution unit 74, the data decoding unit 75 decodes the VM image represented by the received VM image ID using the received encryption key. When the VM image represented by the received VM image ID received from the update data distribution unit 74 is decoded by the data decoding unit 75, the VM image management unit 76 stores the received update data in the VM image represented by the received VM image ID.

As a result, the update data distribution unit 74 can store the received update data in the VM image represented by the received VM image ID using the received encryption key. For example, the update data distribution unit 74 receives the VM image ID "vm_imgA", the encryption key "xxx", and the update data. The update data distribution unit 74 transmits the received VM image ID "vm_imgA" and the encryption key "xxx" to the data decoding unit 75. The update data distribution unit 74 transmits the received VM image ID "vm_imgA" and the update data to the VM image management unit 76.

In this case, the data decoding unit 75 decodes the VM image A 71 represented by the VM image ID "vm_imgA" using the encryption key "xxx". The VM image management unit 76 stores the update data in the VM image A 71 represented by the VM image ID "vm_imgA". Thus, the update data distribution unit 74 can stores the received update data in the appropriate VM image.

The data decoding unit 75 receives the VM image ID and the encryption key from the update data distribution unit 74. When the VM image ID and the encryption key are received from the update data distribution unit 74, the data decoding unit 75 decodes the VM image represented by the received VM image ID using the received encryption key. When the VM image management unit 76 stores the update data in the decoded VM image, the data decoding unit 75 re-encrypts the decoded VM image using the received encryption key.

The VM image management unit 76 receives the VM image ID and the update data from the update data distribution unit 74. When the VM image represented by the received VM image ID is decoded by the data decoding unit 75, the VM image management unit 76 stores the received update data in the VM image represented by the received VM image ID.

For example, the request processing unit 33, the update data delivery destination decision unit 34, the update data management unit 35, the encryption key management unit 36, the update data delivery unit 37, the update data reception unit 73, the update data distribution unit 74, the data decoding unit 75, and the VM image management unit 76 are electronic circuits. Examples of the electronic circuits include an integrated circuit (IC) such as an Application Specific Integrated Circuit (ASIC) or a Field Programmable Gate Array (FPGA), a central processing unit (CPU), and a micro processing unit (MPU).

The configuration management information storage unit 21, the encryption key storage unit 31, and the update data storage unit 32 are storage devices. Examples of the storage devices include a semiconductor memory device such as a random access memory (RAM), a read only memory (ROM), or a flash memory, a hard disk, and an optical disk.

Process of Update Proxy

Figure 6:
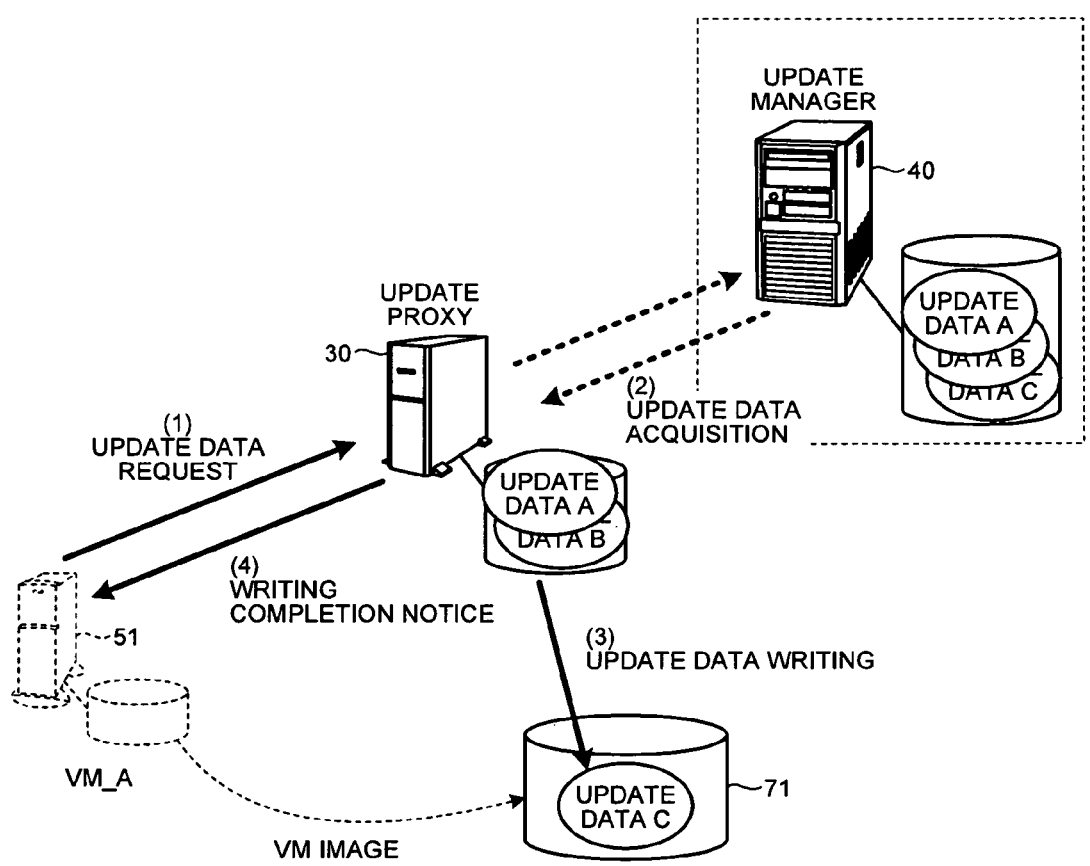
FIG. 6 is a diagram for explaining the flow of a process of distributing update data through an update proxy.

Next, the flow of a process of distributing the update data through the update proxy 30 will be described with reference to FIG. 6. FIG. 6 is a diagram for explaining the flow of a process of distributing the update data through the update proxy. First, as illustrated in (1) of FIG. 1, the update proxy 30 receives a request for update data C from the virtual machine VM_A 51. As a process of requesting the update data by each virtual machine, the update proxy 30 may register an update data request destination to each virtual machine in advance, or the update proxy 30 may intercept a request from each virtual machine to the update manager 40.

Next, the update proxy 30 determines whether or not the update data A, which has been requested for transmission, is being stored. In the example illustrated in FIG. 6, since the update data C is not being stored, the update proxy 30 acquires the update data C from the update manager 40 ((2) of FIG. 6). Next, the update proxy 30 transmits the acquired update data not to the VM_A 51 but to the VM image A 71 that is the VM image of the VM_A 51, so that the update data C is stored in the VM image A 71 ((3) of FIG. 6). Thereafter, the update proxy 30 transmits a writing completion notice to the VM_A 51 ((4) of FIG. 6).

Since the update proxy 30 transmits the requested update data not to the virtual machine but to the VM image used by the virtual machine as described above, the process of transmitting the update data from the virtual machine to the VM image is unnecessary. As a result, the update proxy can reduce the load on the network.

Figure 7:
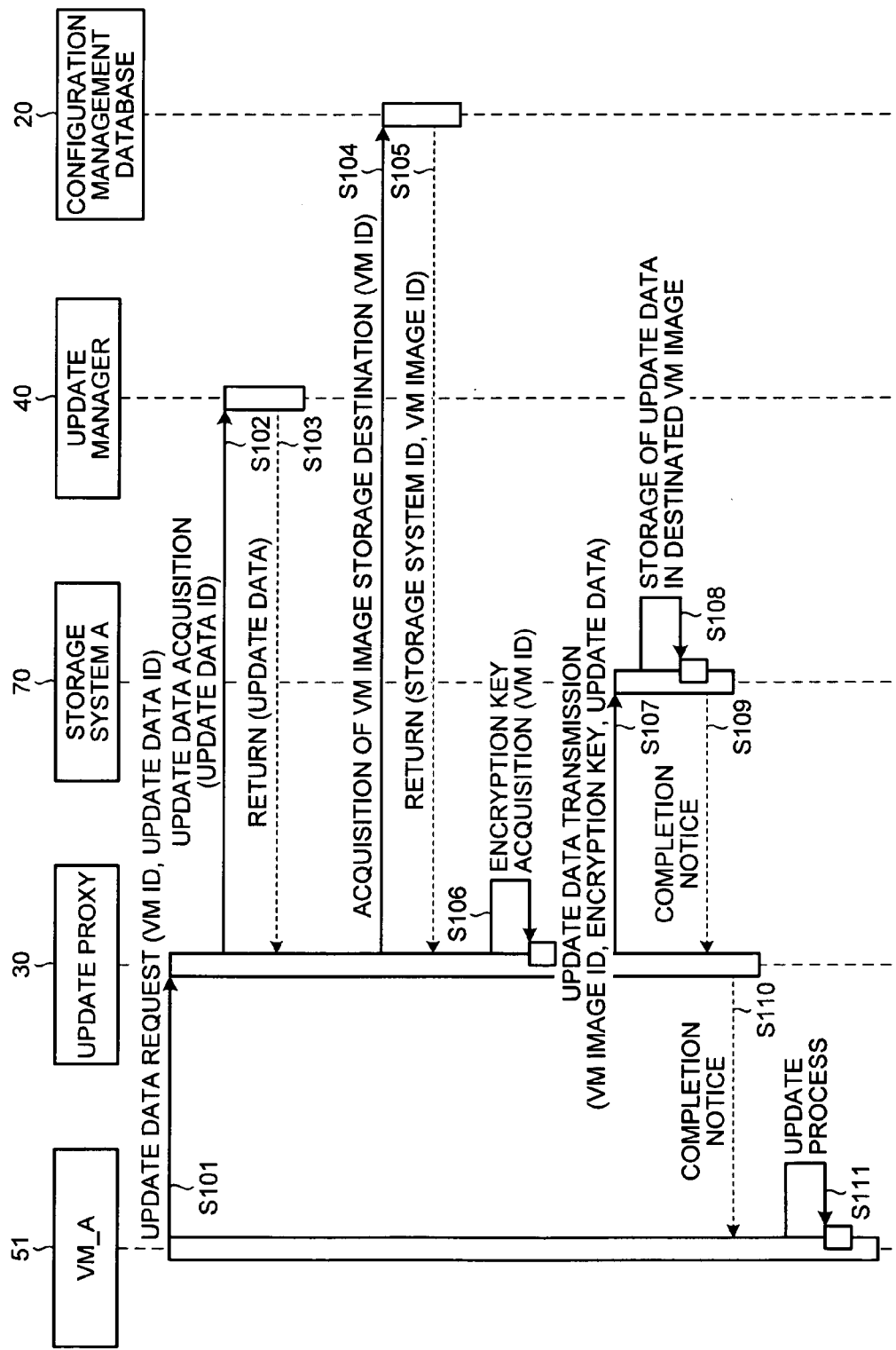
FIG. 7 is a sequence diagram for explaining the flow of a process of a network system.

Next, the flow of a process of distributing the update data in the network system 100 having the update proxy 30 will be described with reference to FIG. 7. FIG. 7 is a sequence diagram for explaining the flow of the network system. First, the update proxy 30 receives an acquisition request that requests the update data (step S101). The acquisition request includes the VM_ID "vm01" of the VM_A 51 and the update data ID representing the update data.

Next, the update proxy 30 acquires the update data ID from the received acquisition request and determines whether or not the device itself is storing the update data represented by the acquired update data ID. When it is determined that the device itself is not storing the update data represented by the update data ID, the update proxy 30 transmits the update data ID to the update manager 40 (step S102) and receives the update data as a return (step S103). When it is determines that the device itself is storing the update data represented by the acquired update data ID, the update proxy 30 skip the processes of step S102 to step S103.

Next, the update proxy 30 retrieves the VM image stored in association with the received VM image ID "vm01" from the configuration management database 20 (step S104). The update proxy 30 receives the VM image ID "vm_imgA" and the storage system ID "storage system A" that are stored in association with the VM_ID "vm01" as a return (step S105).

Next, the update proxy 30 acquires the encryption key "xxx" stored in association with the VM_ID "vm01" (step S106). The update proxy 30 transmits the VM image ID "vm_imgA", the encryption key "xxx", and the update data to the storage system A 70 represented by the storage system ID "storage system A" (step S107).

Next, the storage system A 70 stores the update data in the VM image A 71 represented by the VM image ID "vm_imgA" using the encryption key "xxx" (step S108). Thereafter, the storage system A 70 transmits a notice representing that the update data has been stored to the update proxy 30 (step S109). The update proxy 30 transmits a notice representing that the update data has been stored to the VM_A 51 (step S110). Thereafter, the VM_A 51 executes an update process using the update data stored in the VM image A 71 (step S111). Thereafter, the network system 100 finishes the update data distribution process.

Figure 8:
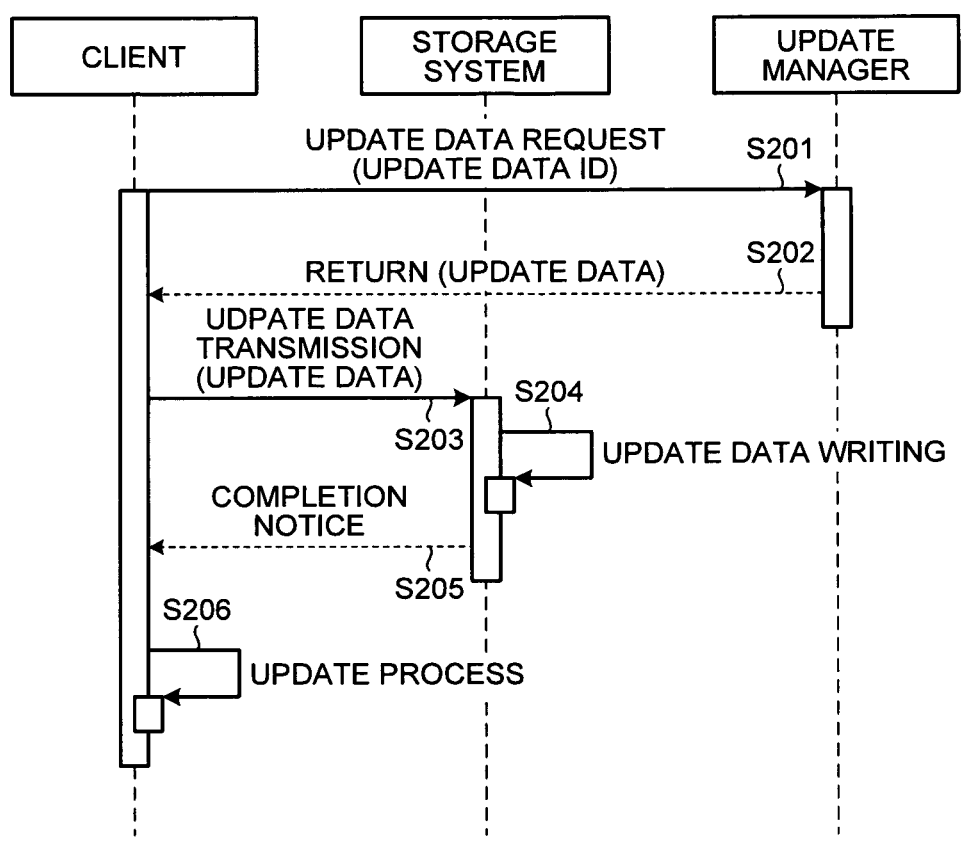
FIG. 8 is a sequence diagram for explaining the flow of a conventional update process.

Next, the flow of a conventional update process will be described with reference to FIG. 8. FIG. 8 is a sequence diagram for explaining the flow of the conventional update process. In an example illustrated in FIG. 8, the client requests the update manager to transmit the update data (step S201). Next, the update manager transmits the requested update data to the client as a return (step S202). The client transmits the update data to the disk image of the storage system used by the client (step S203).

Next, the storage system writes the received update data in the disk image (step S204). The storage system transmits a completion notice to the client (step S205). Thereafter, the client executes the update process. (step S206) and finishes the process. As described above, in the conventional update process, the update data is transmitted from the update manager to the client, and then the update data is transmitted from the client to the storage system, whereby the load on the network increases. However, in the network system 100 according to the present embodiment, since the update data is transmitted directly to the VM image used by the virtual machine that has requested the update data, transmission is unnecessary, and thus the load on the network is reduced.

Figure 9:
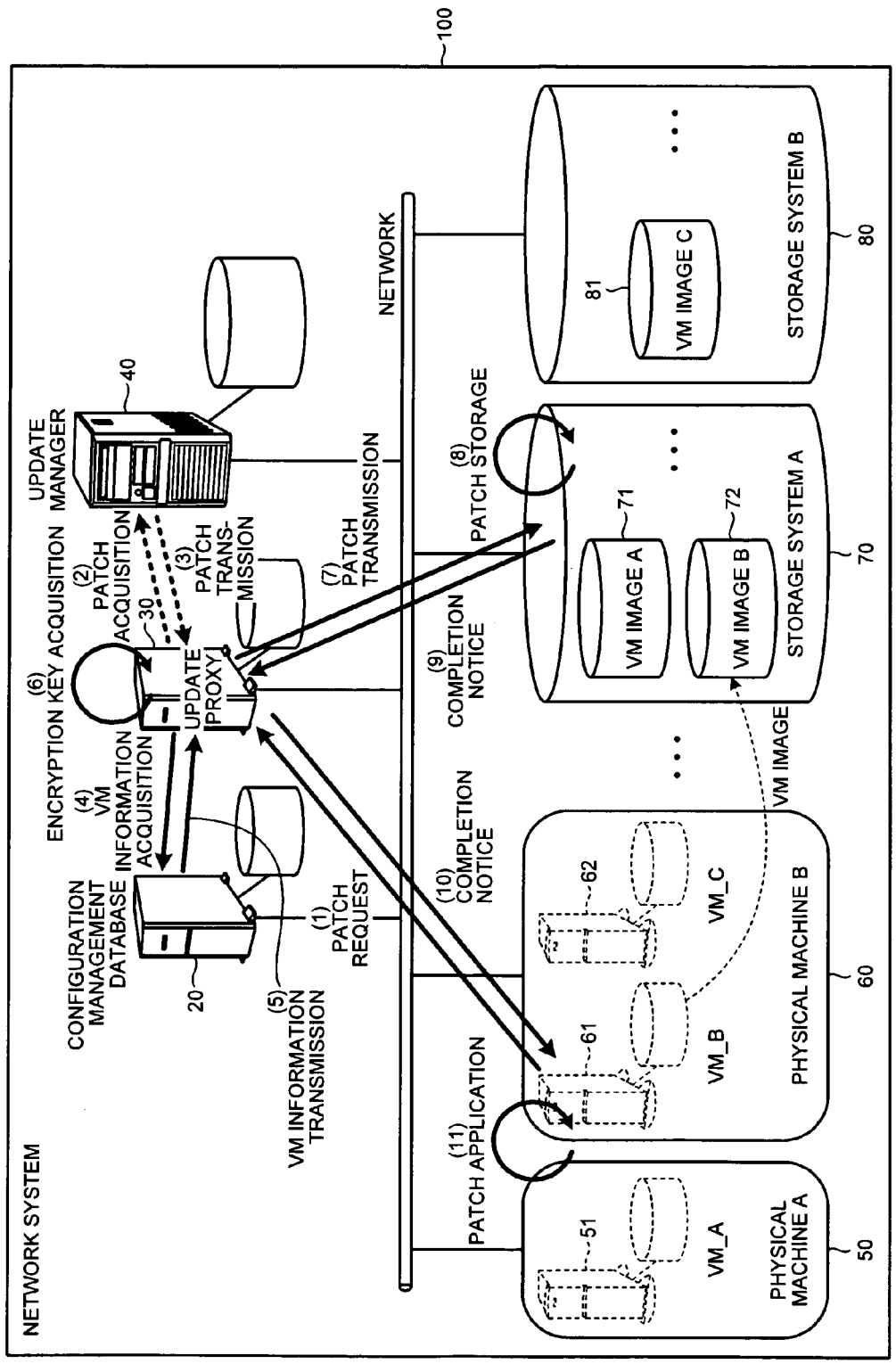
FIG. 9 is a diagram for explaining an exchange of information in a network system.

Next, the flow of exchanging information in the network system 100 will be described with reference to FIG. 9. FIG. 9 is a diagram for explaining an exchange of information in a network system. In an example illustrated in FIG. 9, a description will be made in connection with an example in which the VM_B 61 requests a patch "AAA" of an operating system (OS) as the update data.

For example, the VM_B 61 requests the update proxy 30 to transmits the patch "AAA" of the OS ((1) of FIG. 9). In this case, the update proxy 30 acquires the patch "AAA" from the update manager 40 ((2) and (3) of FIG. 9). Next, the update proxy 30 acquires information of the VM image B 72 used by the VM_B 61 from the configuration management database ((4) and (5) of FIG. 9). The update proxy 30 acquires the encryption key "yyy" used by the VM_B 61 ((6) of FIG. 9). Next, the update proxy 30 transmits the patch "AAA" and the encryption key "yyy" to the VM image B 72 ((7) of FIG. 9).

Thereafter, the storage system A 70 stores the patch "AAA" in the VM image B 72 using the encryption key "yyy" ((8) of FIG. 9) and transmits a completion notice to the update proxy 30 ((9) of FIG. 9. Next, the update proxy 30 transmits a completion notice to the VM_B 61 ((10) of FIG. 9). Next, the VM_B 61 applies the patch "AAA" to the device itself ((11) of FIG. 9) and finishes the process.

Figure 10:
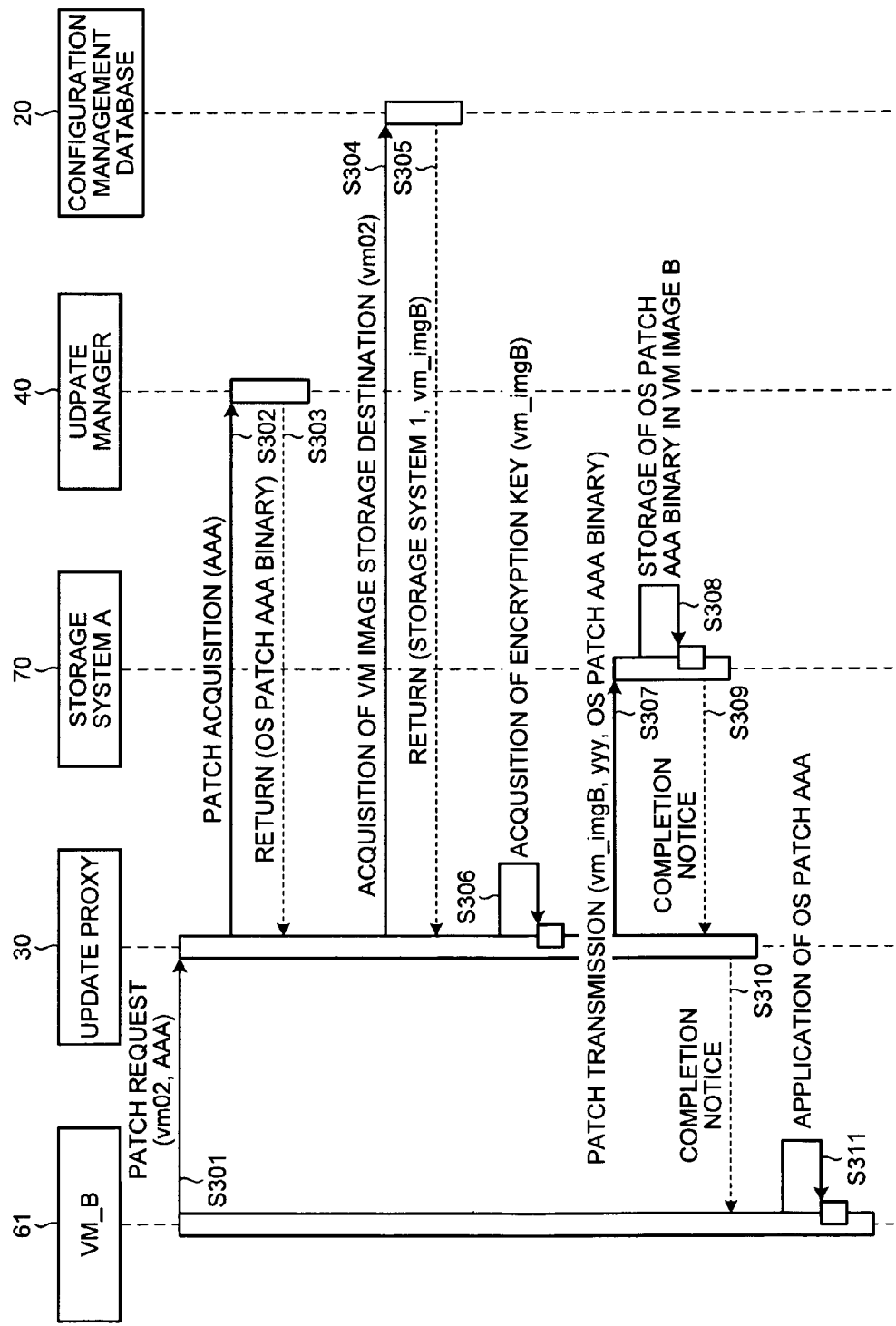
FIG. 10 is a sequence diagram for explaining the flow of a process of applying an OS patch "AAA"

FIG. 10 is a sequence diagram for explaining the flow of a process of applying the OS patch "AAA". As illustrated in FIG. 10, the update proxy 30 transmits the binary of the OS patch "AAA" not to the VM_B 61 but to the VM image B 72 of the storage system A 70 (step S307). Thus, since the update proxy 30 does not require transmission of the OS patch binary from the VM_B 61 to the VM image B 72, the load on the network is reduced. Step S301 to step S311 illustrated in FIG. 10 are the processes corresponding to step S101 to step S111 illustrated in FIG. 7, and thus a detailed description thereof will not be repeated.

Effects of Second Embodiment

As described above, when the update data transmission request is received from the virtual machine, the update proxy 30 specifies the VM_ID of the virtual machine that has requested transmission of the update data. The update proxy 30 acquires the VM image ID, which is stored in association with the acquired VM_ID, from the configuration management information storage unit 21 that stores the VM_ID in association with the VM image ID. Thereafter, the update proxy 30 transmits the update data to the VM image represented by the acquired VM image ID.

Thus, the update proxy 30 does not require the process of transmitting the update data from the virtual machine to the VM image. As a result, the update proxy 30 can reduce the load on the network.

Further, the update proxy 30 determines whether or not the update data, which has been requested for transmission from the virtual machine, is being stored in the device itself. When the update data, which has been requested for transmission from the virtual machine, is not being stored in the device itself, the update proxy 30 acquires the update data which has been requested for transmission from the update manager 40. The update proxy 30 transmits the acquired update data to the VM image.

Thus, even when the update data that is not present in the device itself is requested, the update proxy 30 can acquire the appropriate update data and transmit the acquired update data to the virtual machine. For example, the update proxy 30 can distribute the OS patch that is distributed at a weekly interval or the patch of the OS that is newly distributed to the virtual machine without a time lag.

Further, the update proxy 30 stores the VM_ID in association with the encryption key and acquires the encryption key stored in association with the VM_ID of the virtual machine that has requested the update data. The update proxy 30 transmits the update data which has been requested for transmission and the encryption key to the VM image of the virtual machine that has requested the update data.

Thus, the update proxy 30 can apply the update data to the storage systems 70 and 80 while keeping security of each VM image. For example, the update proxy 30 can appropriately distribute the update data to the VM image of the network in which security is being kept, for example, by access control for each VM image, division of a database, and encryption of the VM image.

[c] Third Embodiment

The embodiments of the present invention have been described above, and the present invention may be implemented in various forms different from the above described embodiments. Another embodiment of the present invention as a third embodiment will be described below.

(1) Regarding Update Data

The second embodiment has been described in connection with the update proxy 30 that distributes the update data to the VM image used by the virtual machine. However, the present invention is not limited to the above embodiment. For example, the update proxy 30 may distribute arbitrary information such as an update patch, a virus pattern definition file, or new software to the VM image.

For example, the update proxy 30 may distribute the update patch to each virtual machine as a Microsoft windows server update services (a registered trademark) (WSUS) server.

(2) Regarding Virtual Machine

The second embodiment has been described in connection with the network system 100 that includes the physical machine that operates the virtual machine and the disk array device that manages the VM image used as the storage device by the virtual machine. However, the present invention is not limited to the above embodiment. For example, the update proxy 30 can reduce the load on the network even when connected to a network system in which the information processing device having the storage device and the virtual machine are present together.

For example, the configuration management information storage unit 21 may store an ID representing the information processing device and an IP address of the information processing device in association with information illustrated in FIG. 4. In this case, the update proxy 30 may transmit the update data to the information processing device when the update data transmission request is received from the information processing device and may transmit the update data to the VM image when the update data transmission request is received from the virtual machine. As a result, the update proxy 30 can reduce the load on the network.

(3) Regarding Encryption

In the second embodiment, the update proxy 30 transmits the update data and the encryption key to the network system that manages the VM image. This transmission path may have a configuration in which encrypted communication is performed in order to further increase security.

For example, when the update data and the encryption key are transmitted to the storage system A 70, the update proxy 30 encrypts the update data and the encryption key using a well-known encryption technique such as RSA encryption. The update proxy 30 transmits the encrypted update data and the encryption key to the storage system A 70. Thereafter, the storage system A 70 decodes the encrypted update data and the encryption key and stores the decoded update data in a predetermined VM image using the decoded encryption key. The update proxy 30 can more safely distribute the update data by encrypting information to be transmitted to the storage systems A 70 and B 80.

Further, when the update proxy 30 is requested to distribute the update data, each virtual machine may execute server authentication of the update proxy 30 in order to confirm that the update proxy 30 is a reliable authorized update proxy.

(4) Program

Figure 11:
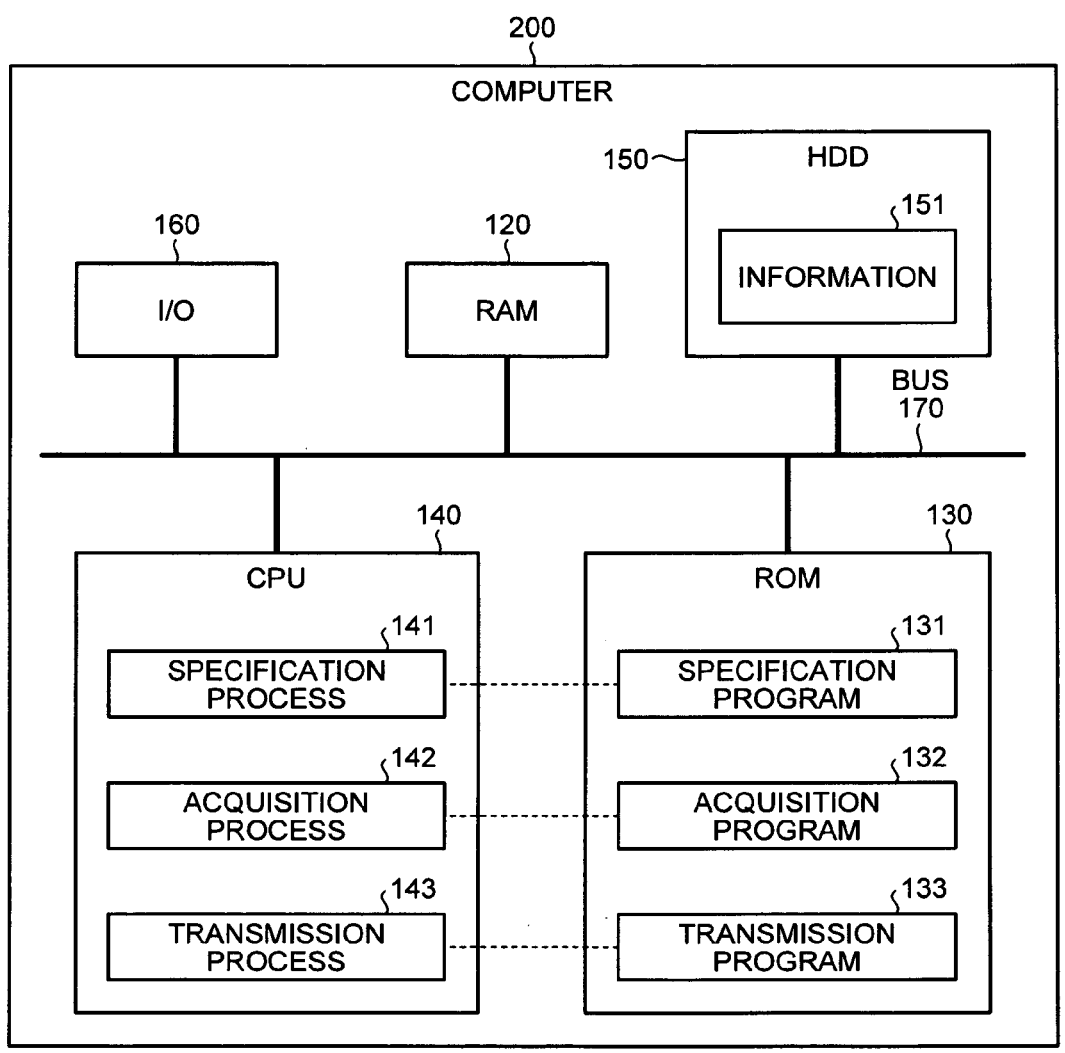
FIG. 11 is a diagram for explaining a computer that executes an information transmission program.
Figure 12:
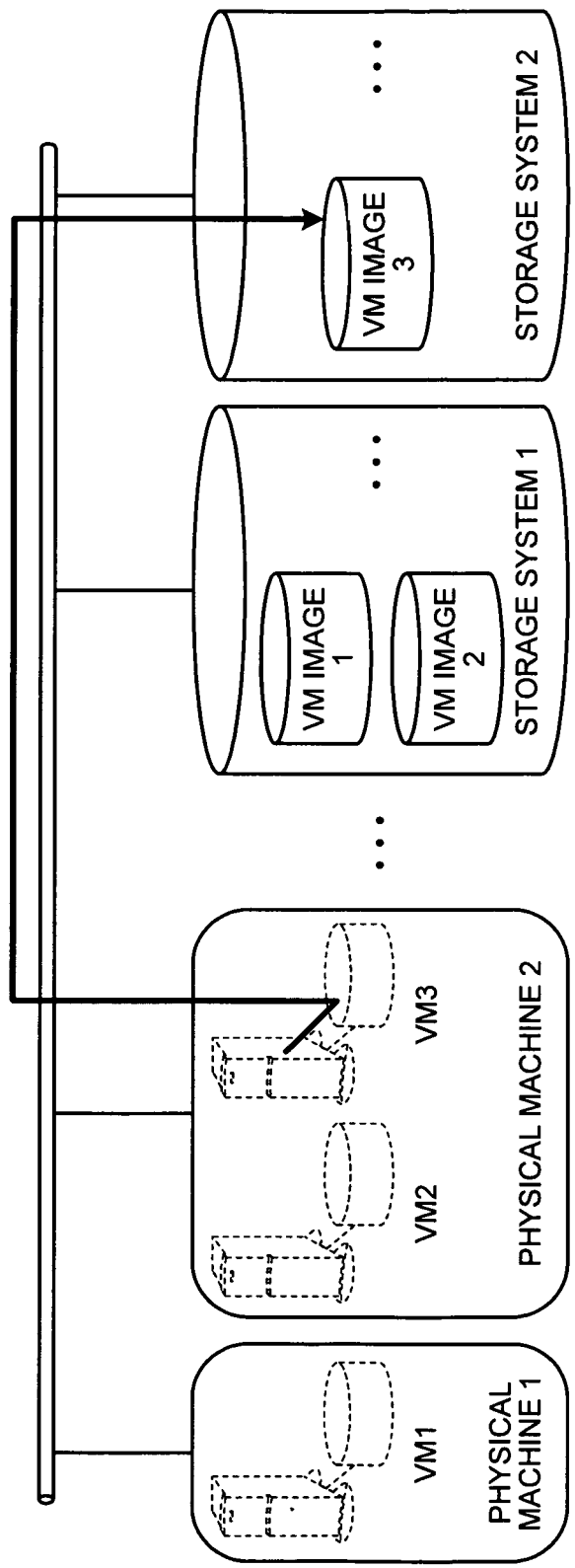
FIG. 12 is a diagram for explaining an operation of a cloud network.
Figure 13:
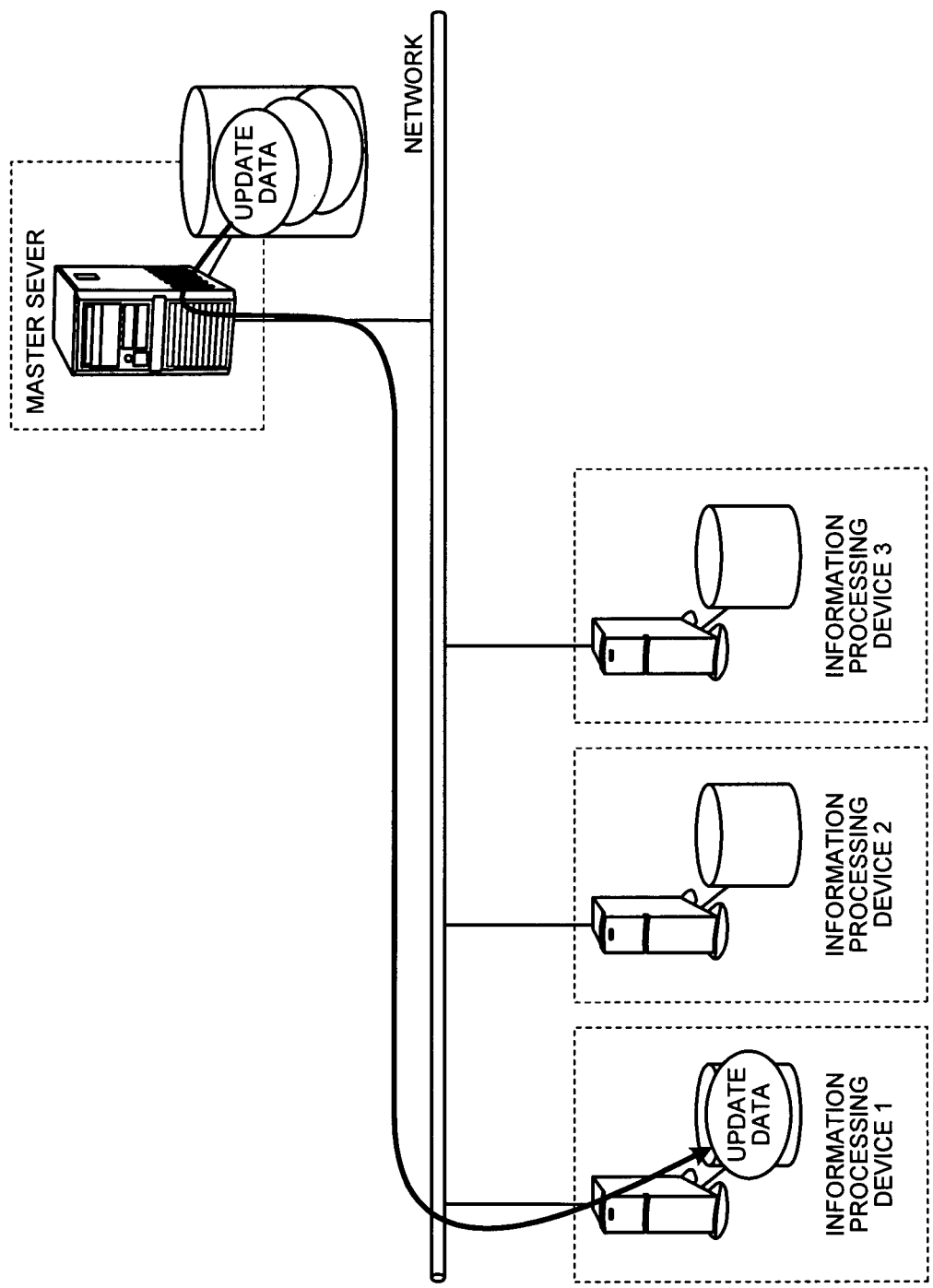
FIG. 13 is a diagram for explaining transmission of update data in a conventional network.
Figure 14:
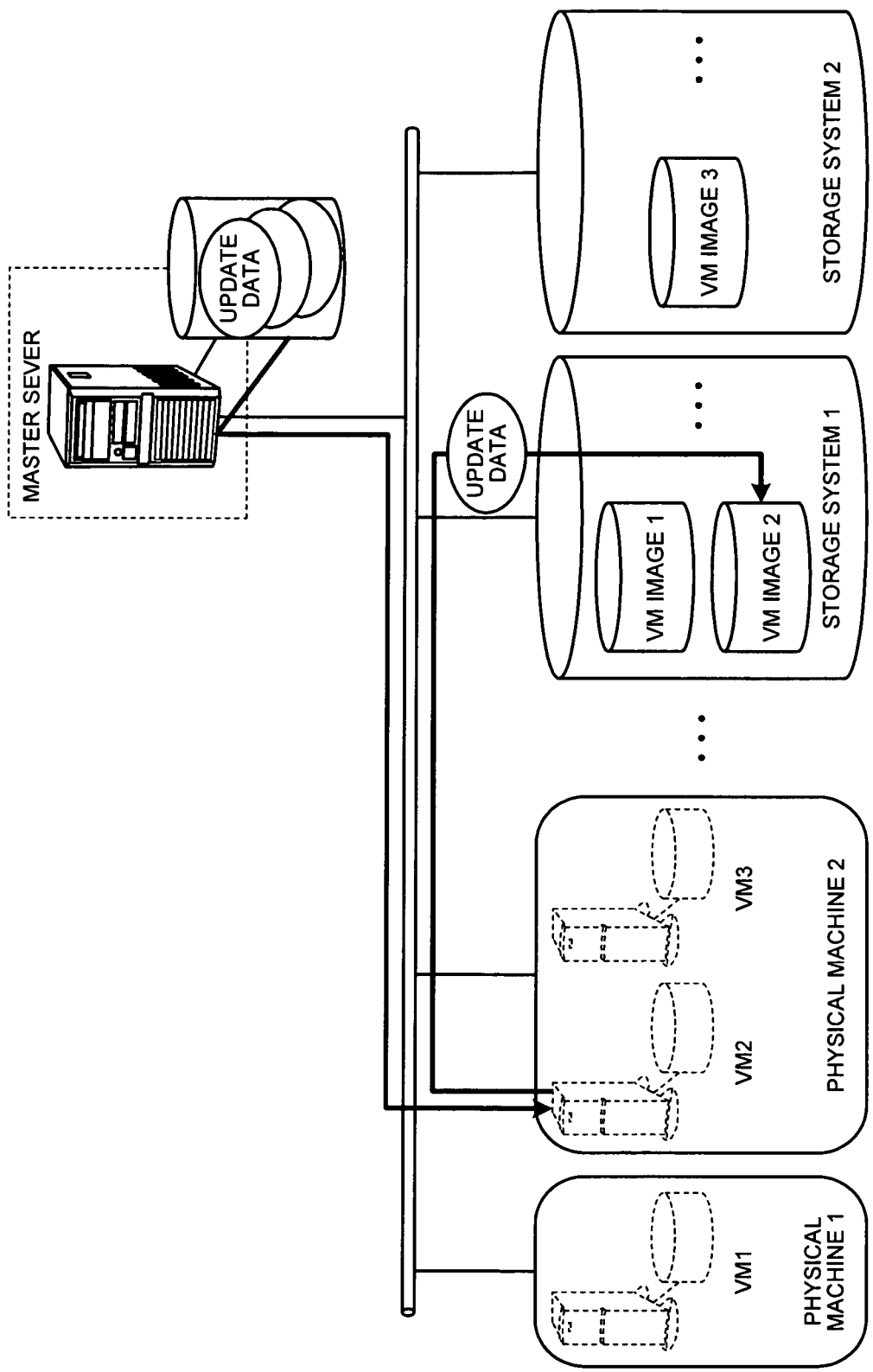
FIG. 14 is a diagram for explaining a process of transmitting update data in a cloud network.

The information transmission device 1 according to the first embodiment and the update proxy according to the second and third embodiments have been described in connection with the case in which a variety of processes are implemented by hardware. However, the present invention is not limited to the above embodiments. For example, the above embodiment may be implemented by a computer that operates previously prepared program as the information transmission device or the update proxy. An example of a computer that executes a program having the same function as the information transmission device illustrated in the first embodiment will be described below with reference to FIG. 11. FIG. 11 is a diagram for explaining a computer that executes an information transmission program.

In a computer 200 illustrated in FIG. 11, a RAM 120, a ROM 130, and a hard disk drive (HDD) 150 are connected through a bus 170. In the computer 200 illustrated in FIG. 11, a CPU 140 is connected through the bus 170. An input/output (I/O) 160 that receives a request from the virtual machine or transmits information to the VM image is connected to the bus 170.

Delivery information 151 is previously stored in the HDD 150. A specification program 131, an acquisition program 132, and a transmission program 133 are previously retained in the ROM 130. By reading the programs 131 to 133 from the ROM 130 through the CPU 140, in an example illustrated in FIG. 11, the programs 131 to 133 function as a specification process 141, an acquisition process 142, and a transmission process 143, respectively. The processes 141 to 143 perform the same functions of the components 3 to 5 illustrated in FIG. 5, respectively. The process 141 to 143 may perform the same functions of the components according to the second embodiment or the third embodiment, respectively.

Further, the information transmission program described in the present embodiment may be implemented by executing a previously prepared program through a computer such as a personal computer (PC) or a workstation. The program may be stored in a storage device, and the program may be read from the storage device and distributed via a network such as the Internet. The program may be recorded in a computer readable recording medium such as a hard disk, a flexible disk (FD), a compact disc read only memory (CD-ROM), a magneto optical disc (MO), and a digital versatile disc (DVD). The program may be read from the recording medium and executed by the computer.

In an aspect, the load on the network can be reduced.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information transmission device comprising:
a storage unit configured to store an identifier representing an information processing device in association with an identifier representing a storage device used by the information processing device, the storage unit further configured to store data whose transmission is requested by the information processing device, and the storage device connected with the information processing device via a network and operated separately from the information processing device;
an encryption key storage unit configured to store the identifier representing the information processing device in association with an encryption key used by the information processing device; and
a processor to, when the information transmission device receives a notice from the information processing device requesting transmission of data from the information transmission device, specify the information processing device which sends the notice, acquire an encryption key stored in association with the specified information processing device, and to transmit the data requested by the notice not to the specified information processing device but directly to the storage device represented by the identifier stored in the storage unit and associated with the identifier representing the specified information processing device,
wherein the processor transmits data on a request for transmission by the information processing device and the encryption key acquired to the storage device represented by the identifier; and
wherein the information processing device is a virtual machine, and the storage device is a virtual machine disk used by the virtual machine as a storage device.

2. The information transmission device according to claim 1, wherein
the processor includes determining whether or not the device itself is storing data on a request for transmission by the information processing device, acquiring the data from an external information processing device when it is determined that the device itself is not storing the data on a request for transmission by the information processing device, and transmitting the acquired data to the storage device represented by the identifier.

3. An information transmission device comprising:
a storage means for storing an identifier representing an information processing device in association with an identifier representing a storage device used by the information processing device, the storage means further stores data whose transmission is requested by the information processing device, and the storage device connected with the information processing device via a network and operated separately from the information processing device;
a specification means for, when the information transmission device receives a notice from the information processing device requesting transmission of data from the information transmission device, specifying the information processing device which sends the notice;
an encryption key acquisition means for acquiring an encryption key stored in association with the information processing device specified by the specification means, and
a transmission means for transmitting the data requested by the notice not to the specified information processing device but directly to the storage device represented by the identifier stored in the storage means and associated with the identifier representing the specified information processing device;

an encryption key storage means for storing the identifier representing the information processing device in association with an encryption key used by the information processing device, wherein the transmission means transmits data on a request for transmission by the information processing device and the encryption key acquired by the encryption key acquisition means to the storage device represented by the identifier, and wherein the information processing device is a virtual machine, and the storage device is a virtual machine disk used by the virtual machine as a storage device.

4. The information transmission device according to claim 3, wherein the transmission means determines whether or not the device itself is storing data on a request for transmission by the information processing device, acquires the data from an external information processing device when it is determined that the device itself is not storing the data on a request for transmission by the information processing device, and transmits the acquired data to the storage device represented by the identifier.

5. A network system comprising:

an information transmission device that includes
- a storage unit that stores an identifier representing an information processing device in association with an identifier representing a storage device used by the information processing device, the storage unit further configured to store data whose transmission is requested by the information processing device, and the storage device connected with the information processing device via a network and operated separately from the information processing device,
- an encryption key storage unit that stores the identifier representing the information processing device in association with an encryption key used by the information processing device,
- a specification unit that, when the information transmission device receives a notice from the information processing device requesting transmission of data from the information transmission device, specifies the information processing device which sends the notice,
- an encryption key acquisition unit that acquires an encryption key stored in association with the information processing device specified by the specification unit from the encryption key storage unit, and
- a transmission unit that transmits the data requested by the notice and the encryption key acquired by the encryption key acquisition unit not to the specified information processing device but directly to the storage device represented by the identifier stored in the storage unit and associated with the identifier representing the specified information processing device,
- wherein the information processing device is a virtual machine, and the storage device is a virtual machine disk used by the virtual machine as a storage device; and a storage device that includes
- an encryption information storage unit that, when the data and the encryption key are received from the information transmission device, stores the received data using the received encryption key.

6. The network system according to claim 5, wherein the transmission unit includes determining whether or not the device itself is storing data on a request for transmission by the information processing device, acquiring the data from an external information processing device when it is determined that the device itself is not storing the data on a request for transmission by the information processing device, and transmitting the acquired data to the storage device represented by the identifier.

7. An information transmission method performed in an information transmission device that includes a storage unit, the storage unit storing an identifier representing an information processing device in association with an identifier representing a storage device used by the information processing device, the storage unit further configured to store data whose transmission is requested by the information processing device, and the storage device connected with the information processing device via a network and operated separately from the information processing device, the information transmission device further includes an encryption key storage unit configured to store the identifier representing the information processing device in association with an encryption key used by the information processing device the information transmission method comprising:

specifying, when the information transmission device receives a notice from the information processing device requesting transmission of data from the information transmission device, the information processing device which sends the notice;

acquiring an encryption key stored in association with the specified information processing device; and transmitting the data requested by the notice not to the specified information processing device but directly to the storage device represented by the identifier stored in the storage unit and associated with the identifier representing the specified information processing device, wherein the information processing device is a virtual machine, and the storage device is a virtual machine disk used by the virtual machine as a storage device, and wherein the transmitting includes transmitting data on a request for transmission by the information processing device and the encryption key acquired to the storage device represented by the identifier.

8. The information transmission method according to claim 7, wherein the transmitting includes determining whether or not the device itself is storing data on a request for transmission by the information processing device, acquiring the data from an external information processing device when it is determined that the device itself is not storing the data on a request for transmission by the information processing device, and transmitting the acquired data to the storage device represented by the identifier.

9. A computer-readable, non-transitory medium storing an information transmission program that causes a computer to execute a process, the computer including a storage unit storing an identifier representing an information processing device in association with an identifier representing a storage device used by the information processing device, the computer includes an encryption key storage unit configured to store the identifier representing the information processing device in association with an encryption key used by the information processing device, the storage unit further configured to store data whose transmission is requested by the information processing device, and the storage device connected with the information processing device via a network and operated separately from the information processing device, the process comprising:

specifying, when the information transmission device receives a notice from the information processing device requesting transmission of data from the information transmission device, the information processing device which sends the notice;

acquiring an encryption key stored in association with the specified information processing device; and transmitting the data requested by the notice not to the specified information processing device but directly to the storage device represented by the identifier stored in the storage unit and associated with the identifier representing the specified information processing device, wherein the information processing device is a virtual machine, and the storage device is a virtual machine disk used by the virtual machine as a storage device, the transmitting includes transmitting data on a request for transmission by the information processing device and the encryption key acquired to the storage device represented by the identifier.

10. The computer-readable, non-transitory medium according to claim 9, wherein the transmitting includes determining whether or not the device itself is storing data on a request for transmission by the information processing device, acquiring the data from an external information processing device when it is determined that the device itself is not storing the data on a request for transmission by the information processing device, and transmitting the acquired data to the storage device represented by the identifier.

* * * * *